United States Patent
Shenoi et al.

(10) Patent No.: US 7,039,103 B2
(45) Date of Patent: May 2, 2006

(54) ASYMMETRIC DIGITAL SUBSCRIBER LINE METHODS SUITABLE FOR LONG SUBSCRIBER LOOPS

(75) Inventors: Kishan Shenoi, Saratoga, CA (US); Sandro Squadrito, San Jose, CA (US); Gary Bogardus, San Carlos, CA (US)

(73) Assignee: Symmetricom, Inc., San Jose, CA (US)

( * ) Notice: Subject to any disclaimer, the term of this patent is extended or adjusted under 35 U.S.C. 154(b) by 558 days.

(21) Appl. No.: 10/284,057

(22) Filed: Oct. 30, 2002

(65) Prior Publication Data

US 2003/0063660 A1    Apr. 3, 2003

Related U.S. Application Data

(63) Continuation of application No. 09/821,841, filed on Mar. 28, 2001, now Pat. No. 6,507,606.

(60) Provisional application No. 60/193,061, filed on Mar. 29, 2000.

(51) Int. Cl.
*H04B 1/38*    (2006.01)

(52) U.S. Cl. ..................................... 375/220; 375/222

(58) Field of Classification Search ................ 375/211, 375/213, 214, 220–223; 379/340, 344–374, 379/274

See application file for complete search history.

(56) References Cited

U.S. PATENT DOCUMENTS 3,843,844 A    10/1974    Schumperli ................... 179/16

(Continued)

FOREIGN PATENT DOCUMENTS

EP    0853390 A2    7/1998

(Continued)

OTHER PUBLICATIONS

Wang et al., "Automatic gain control VLSI architecture foe ADSL-1 cap system," *Journal of the Chinese Institute of Electrical Engineering.*, pp. 261-268, 1995.

(Continued)

*Primary Examiner*—Don N. Vo
(74) *Attorney, Agent, or Firm*—John Bruckner PC

(57) ABSTRACT

Systems and methods are described for asymmetric digital subscriber loops. A method includes utilizing a circuit having a first end and a second end, the circuit having a first amplification interface connecting the first end to the second end in a first direction, and a second amplification interface connecting the second end to the first end in a second direction; adapting the first amplification interface to provide a first gain adjustment as a function of a first attenuation of a first communication by a first direction impedance from the transmission medium while transmitting in the first direction, the first communication within a first frequency range over the transmission medium from the first end to the second end; and adapting the second amplification interface to provide a second gain adjustment as a function of a second attenuation of a second communication by a second direction impedance from the transmission medium while transmitting in the second direction, the second communication within a second frequency range over the transmission medium from the second end to said first end. An apparatus includes a modulator for transmitting a first communication, in a first direction over a transmission medium, the modulator operably coupled to a first amplification interface for providing a first gain adjustment, based on a first attenuation of the first communication in the first direction by a first direction impedance of the transmission medium; and a demodulator operably coupled to the modulator, for receiving a second communication, in a second direction over the transmission medium, the demodulator operably coupled to a second amplification interface for providing a second gain adjustment, based on a second attenuation of the second communication in the second direction by a second direction impedance of the transmission medium.

24 Claims, 7 Drawing Sheets

U.S. PATENT DOCUMENTS

| | | | | |
|---|---|---|---|---|
| 4,037,066 | A | * | 7/1977 | Kiko .......................... 379/400 |
| 4,131,766 | A | | 12/1978 | Narasimha .............. 179/15 FD |
| 4,237,551 | A | | 12/1980 | Narasimha ................... 370/50 |
| 4,277,655 | A | * | 7/1981 | Surprenant ................. 379/340 |
| 4,323,733 | A | * | 4/1982 | Ott et al. .................... 379/146 |
| 5,095,528 | A | | 3/1992 | Leslie et al. .................. 455/10 |
| 5,610,922 | A | | 3/1997 | Balatoni ..................... 370/468 |
| 5,627,501 | A | | 5/1997 | Biran et al. ................ 333/17.1 |
| 5,691,718 | A | | 11/1997 | Balatoni et al. ............ 341/126 |
| 5,790,174 | A | | 8/1998 | Richard, III et al. ........... 348/7 |
| 5,883,941 | A | | 3/1999 | Akers ...................... 379/93.08 |
| 5,956,323 | A | | 9/1999 | Bowie ........................ 370/241 |
| 5,982,785 | A | | 11/1999 | Woerner et al. ............ 370/488 |
| 6,029,048 | A | | 2/2000 | Treatch .......................... 455/7 |
| 6,092,122 | A | | 7/2000 | Liu et al. .................... 375/233 |
| 6,118,766 | A | | 9/2000 | Akers ......................... 370/249 |
| 6,130,882 | A | | 10/2000 | Levin ......................... 370/252 |
| 6,141,330 | A | | 10/2000 | Akers ......................... 370/264 |
| 6,236,664 | B1 | | 5/2001 | Erreygers .................. 370/352 |

FOREIGN PATENT DOCUMENTS

| | | |
|---|---|---|
| GB | 2 337 380 A | 11/1999 |
| KR | 0065094 | 8/1999 |
| WO | WO 95/17046 | 6/1995 |

OTHER PUBLICATIONS

"HomePortal™ 1000: Bringing the power of DSL Home," *2Wire, Inc.* brochure, 1999.

"Analog front end for ADSL extends linearity and local-loop length," Article from the *END magazine* web site at: www.ednmag.com, Jan. 21, 1999.

"DSL is coming! DSL is coming!," Article from the *Teleconnect* web site at: www.teleconnect.com, Sep. 5, 2000.

"Communications companies stay ahead of the curve," Article from the *NetWorkFusion* web site at: www.nwfusion.com, Dec. 18, 2000.

"Microfilter design promises peaceful coexistence beetween ADSL and the voiceband. (Technology Information)," *EDN magazine* article as it appears on the FindArticles web site at: www.fidnarticles.com, Dec. 9, 1999.

"GDSL: GTE selects GoDigital's GDSL-8 access system: GDSL-8 system quickly meets the demand for GTE's added line growth," *EDGE* article as it appears on the FindArticles web site at: www.findarticles.com, Sep. 28, 1999.

"GoDigital Networks Increases reliabiltiy of DSL services and extends reach to 25 miles from central office," *PR Newswire* article as it appears on the FindArticles web site at: www.findarticles.com, Oct. 13, 1999.

"GDSL-8: GoDigital Telecommunications, Inc. introduces four line drop flexibiltiy with its GDSL-8 digital replacement system for analog carrier, meeting increased local loop line demand and internet access speeds. (Product Announcement)," *EDGE* article as it appears on the FindArticles web site at: www.findarticles.com, Feb. 8, 1999.

"GoDigital Telecommunciations, Inc. introduces long loop high speed internet access support with its GDSL BRI-3 product line," *Business Wire* article as it appears on the FindArticles web site at: www.findarticles.com, Mar. 22, 1999.

"Microfilter design promises peaceful coexistence between ADSL and the voiceband. (Technology Information)," *EDN* article as it appears on the FindArticles web site at: www.findarticles.com, Dec. 9, 1999.

"GoDigtal networks adds extended range drops to serve hard-to-reach subscribers," *PR Newswire* article as it appears on the FindArticles web site at: www.findarticles.com, Jan. 18, 2000.

"The next big home networking thing, (Technology Information)," *Home Office Computing* article as it appears on the FindArticles web site at: www.findarticles.com, Mar. 2000.

"Intranets and I-commerce-hotlinks (news briefs)," *InfoWorld* article as it appears on the FindArticles web site at: www.findarticles.com, Mar. 6, 2000.

"The fastest towns in America (Technology Information)," *Home Office Computing* article as it appears on the FindArticles web site at: wwww.findarticles.com, Apr. 2000.

"2Wire Inc. (2W HomePortal)," *America's Network* article as it appears on the FindArticles web site at: www.findarticles.com, Jun. 1, 2000.

"Symmetricom's new GoLong solution doubles current reach of ADSL, enabling ADSL everywhere," *Business Wire* article as it appears on the FindArticles web site at: www.findarticles.com, Jun. 7, 2000.

"TriMedia boxes ready soon," *Electronics Times* article as it appears on the FindArticles web ssite at: www.findarticles.com, Sep. 18, 2000.

"General bandwidth and 2Wire partner to deliver VoDSL solution for the residential market," *Cambridge Telecom Report* article as it appears on the FindArticles web site at: www.findarticles.com, Jun. 5, 2000.

"Office Depot and 2Wire announce strategic retail partnership for leading residential Gateway products," *EDGE: Work-Group Computing Report* article as it appears on the FindArticles web site at: www.findarticles.com, Jun. 5, 2000.

"GoDigital Networks first to introduce line-powered solution for delivering both voice and DSL to any location," *PR Newswire* article as it appears on the FindArticles web site at: www.find articles.com, Jun. 6, 2000.

"The 39 (Network) Steps. (News Briefs)," *Home Office Computing* article as it appears on the FindArticles web site at: www.findarticles.com, Aug. 2000.

"2Wire delivers HomePortal residential Gateway to consumers for ultra-fast internet access and easy home networking," *Business Wire* article as it appears on the FindArticles web site at: www.findarticles.com, Oct. 10, 2000.

"Independent laboratory testing confirms the Symmetricom's GoLong doubles the reach of ADSL services," *Business Wire* article as it appears on the FindArticles web site at: www.findarticles.com, Nov. 7, 2000.

"Chester Telephone doubles the serving distance of its DSL services using Symmetricom's GoLong loop extender; field trials to begin in Chester, S.C. mid-Dec. 2000," *Business Wire* article as it appears on the FindArticles web site at: www.findarticles.com, Dec. 4, 2000.

"Symmetricom's Go-Long loop extender doubles the serving distance of Chester Telephone's DSL services; field trials to begin in Chester, S.C. mid-Dec. 2000," *Business Wire* article as it appears on the FindArticles web site at: www.findarticles.com, Dec. 4, 2000.

"Symmetricom replaces headline in Chester Telephone release; Symmetricom's Go-Long loop extender doubles the serving distance of Chester Telephone's DSL services," *Business Wire* article as it appears on the FindArticles web site at: www.findarticles.com, Dec. 4, 2000.

Jones, "Frequency Domain Echo Cancellation for Discrete Multitone Asymmetric Digital Subscriber Line Transceivers," *IEEE Transactions on Communications*, 43(2):1663-1672, 1995.

International Search Report dated Oct. 10, 2001.

* cited by examiner 1.0-A :EXTENDER SPACING = 6000 FEET; LOAD COILS = 88 mH
1.0-B :EXTENDER SPACING = X (TBD); NO LOAD COILS

ASYMMETRIC DIGITAL SUBSCRIBER LINE METHODS SUITABLE FOR LONG SUBSCRIBER LOOPS

CROSS-REFERENCE TO RELATED APPLICATIONS

This application is a continuation of, and claims a benefit of priority under 35 U.S.C. 120 of U.S. Ser. No. 09/821,841 by inventors Kishan Shenoi, Sandro Squadrito and Gary Bogardus, entitled Asymmetric Digital Subscriber Line Methods Suitable for Long Subscriber Loops filed on Mar. 28, 2001 now U.S. Pat. No. 6,507,606 which in turn claims a benefit of priority under 35 U.S.C. 119(e) to U.S. Ser. No. 60/193,061, filed Mar. 29, 2000, the entire contents of which are hereby incorporated by reference for all purposes.

BACKGROUND OF THE INVENTION

1. Field of the Invention

The invention relates generally to the field of communications. More particularly, the invention relates to digital subscriber loop (DSL) communications. Specifically, a preferred implementation of the invention relates to extending the range of an asymmetric digital subscriber loop (ADSL). The invention thus relates to ADSL of the type that can be termed extended.

2. Discussion of the Related Art

Conventional telephony, often called plain old telephone service (POTS), is provided to customers over copper cable. This copper cable can be termed a subscriber loop or a subscriber line. Modem loop plant designs specify the use of 26-gauge cable for short to medium loop lengths with 24-gauge cable used to extend the range. Legacy loop plant includes cable of 22-gauge as well as 19-gauge.

At the customer premises, a telephone set is typically connected to the cable. The other end of the cable is connected to a line circuit module in the service provider's central office (CO). Switches terminating customer loops at the central office are regarded as Class-5 switches and provide a dial-tone. The customer premise equipment (CPE) can include a personal computer (PC) modem.

Older central office switches were analog in nature and were unable to provide a broad range of services. Modem central office switches are digital. Digital switches include codecs in the line circuit to do the bilateral analog-digital (A/D) conversion; the transmission over the loop is analog and the signals occupy a frequency band of up to (approximately) 4 kHz. Conventional telephony codecs convert at an 8 kHz sampling rate and quantize to 8 bits per sample corresponding to a net bit rate of 64 kbps (or "DS0").

With the advent of digital terminal equipment, such as personal computers, modems were developed to carry digital bit streams in an analog format over the cable pair. Because of the 4 kHz constraint imposed by the A/D converter in the line circuit, the data rate of such transmission is limited and is typically 9.6 kbps. More elaborate schemes have been proposed which permit higher bit rates (e.g. V.34 which can do in excess of 28.8 kbps). More recently, there are schemes that "spoof" the D/A converter in the line-circuit operate at bit rates as high as 56 kbps in the downstream direction (from CO to CPE). With increasing deployment of, and consequently demand for, digital services it is clear that this bit rate is insufficient.

An early proposal to increase the information carrying capacity of the subscriber loop was ISDN ("Integrated Services Digital Network"), specifically the BRI ("Basic Rate Interface") which specified a "2B+D" approach where 2 bearer channels and one data channel (hence 2B+D) were transported between the CO and the CPE. Each B channel corresponded to 64 kbps and the D channel carried 16 kbps. With 16 kbps overhead, the loop would have to transport 160 kbps in a full duplex fashion. This was the first notion of a Digital Subscriber Loop ("DSL") (or Digital Subscriber Line). However, this approach presumed that POTS and 2B+D would not coexist (simultaneously). The voice codec would be in the CPE equipment and the "network" would be "all-digital". Most equipment was designed with a "fallback" whereby the POTS line-circuit would be in a "standby" mode and in the event of a problem such as a power failure in the CPE, the handset would be connected to the loop and the conventional line-circuit would take over. There are several ISDN DSLs operational today.[1-2]

Asymmetric digital subscriber loop (ADSL) was proposed to provide a much higher data rate to the customer in a manner that coexisted with POTS. Recognizing that the spectral occupancy of POTS is limited to low frequencies, the higher frequencies, could be used to carry data (the so-called Data over Voice approach). Nominally, ADSL proposed that 10 kHz and below would be allocated to POTS and the frequencies above 10 kHz for data. Whereas the nominal ADSL band is above 10 kHz, the latest version of the standard specifies that the "useable" frequency range is above 20 kHz. This wide band between 4 kHz and the low edge of the ADSL band simplifies the design of the filters used to segregate the bands.

Furthermore, it was recognized that the downstream data rate requirement is usually much greater than the upstream data rate requirement. Several flavors ("Classes") of ADSL have been standardized, involving different data rates in the two directions. The simplest is Class-4 which provides (North American Standard) 1.536 Mbps in the downstream direction and 160 kbps in the upstream direction. The most complicated, Class-1, provides about 7 Mbps downstream and 700 kbps upstream.[3-4]

A stumbling block in specifying, or guaranteeing, a definite bit rate to a customer is the nature of the loop plant. Customers can be at varied geographical distances from the central office and thus the length of the subscriber loop is variable, ranging from short (hundreds of feet) to long (thousands of feet) to very long (tens of thousands of feet). The essentially lowpass frequency response of subscriber cable limits the usable bandwidth and hence the bit rate.

Moreover, loops longer than (approximately) 18 thousand feet have a lowpass characteristic that even affects the voiceband. Such loops are specially treated by the addition of load coils and are called "loaded loops". The principle is to splice in series-inductors which have the impact of "boosting" the frequency response at (approximately) 4 kHz with the secondary effect of increasing the attenuation beyond 4 kHz very substantially. In these loaded loops, the spectral region above 10 kHz is unusable for reliable transmission. Consequently, the categorical statement can be made that DSL (including ADSL, "2B+D", and other flavors of DSL) cannot be provided over long loops and definitely cannot be provided over loaded loops.

Heretofore, there has not been a completely satisfactory approach to providing DSL over long loops. Further, there has not been a satisfactory approach to providing DSL over loaded loops. What is needed is a solution that addresses one, or both, of these requirements. The invention is directed to meeting these requirements, among others.

SUMMARY OF THE INVENTION

There is a need for the following embodiments. Of course, the invention is not limited to these embodiments.

One embodiment of the invention is based on a method, comprising: utilizing a circuit having a first end and a second end, said circuit having a first amplification interface connecting said first end to said second end in a first direction, and a second amplification interface connecting said second end to said first end in a second direction; adapting said first amplification interface to provide a first gain adjustment as a function of a first attenuation of a first communication by a first direction impedance from said transmission medium while transmitting in said first direction, said first communication within a first frequency range over said transmission medium from said first end to said second end; and adapting said second amplification interface to provide a second gain adjustment as a function of a second attenuation of a second communication by a second direction impedance from said transmission medium while transmitting in said second direction, said second communication within a second frequency range over said transmission medium from said second end to said first end. Another embodiment of the invention is based on an apparatus, comprising: a modulator for transmitting a first communication, in a first direction over a transmission medium, said modulator operably coupled to a first amplification interface for providing a first gain adjustment, based on a first attenuation of said first communication in said first direction by a first direction impedance of said transmission medium; and a demodulator operably coupled to said modulator, for receiving a second communication, in a second direction over said transmission medium, said demodulator operably coupled to a second amplification interface for providing a second gain adjustment, based on a second attenuation of said second communication in said second direction by a second direction impedance of said transmission medium.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
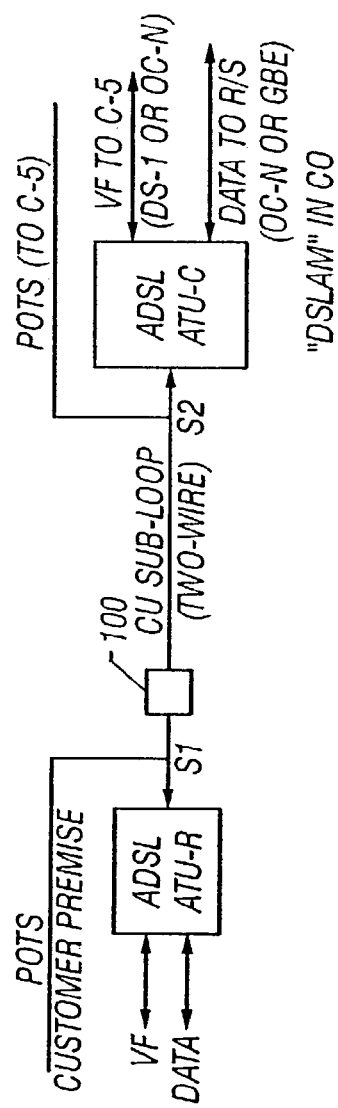
FIG. 1 illustrates a block schematic view of the more important components of an ADSL repeater equipped subscriber loop, representing an embodiment of the invention.

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

Within this application several publications are referenced by superscripts composed of Arabic numerals within parentheses. Full citations for these, and other, publications may be found at the end of the specification immediately preceding the claims after the section heading References. The disclosures of all these publications in their entireties are hereby expressly incorporated by reference herein for the purpose of indicating the background of the invention and illustrating the state of the art.

The below-referenced U.S. Patents and Patent Application disclose embodiments that were satisfactory for the purposes for which they are intended. The entire contents of U.S. Pat. No. 4,131,766, Issued Dec. 26, 1978 and U.S. Pat. No. 4,237,551, Issued Dec. 2, 1980 are hereby expressly incorporated by reference herein for all purposes. The entire contents of U.S. patent application Ser. No. 09/476,770, filed Jan. 3, 2000 are hereby expressly incorporated by reference herein for all purposes.

The invention can include an approach to modify the modems at either end of a DSL (e.g., the Central Office and the Customer Premise) so as to best utilize the fact that there may be repeaters deployed mid-span on the line. As described below in more detail, where the repeaters would be of the form described by U.S. patent application Ser. No. 09/476,770, the invention can provide significant advantages.

The context of the invention includes digital subscriber loops. One species of digital subscriber loops is an asymmetrical digital subscriber loop. A preferred embodiment of the invention using ADSL repeaters (in place of load coils) enables a form of ADSL that uses the technique of frequency-division-duplexing to be provided to customers over very long loops.

The agreed upon standard for ADSL is the DMT (Discrete Multi-Tone) method. A premise underlying DMT is that the channel, namely the subscriber loop, does not have a "flat" frequency response. The attenuation at 1 Mhz ("high" frequency) can be as much as 60 dB greater than at 10 kHz ("low" frequency). Furthermore this attenuation varies with the length of the cable. By using Digital Signal Processing ("DSP") techniques, specifically the theory of the Discrete Fourier Transform ("DFT") and Fast Fourier Transform ("FFT") for efficient implementation, the DMT method splits the available frequency band into smaller sub-channels of (approximately) 4 kHz. Each sub-channel is then loaded with a data rate that it can reliably support to give the desired aggregate data rate. Thus lower (center-)frequency sub-channels will normally carry a greater data rate than the sub-channels at higher (center-)frequencies.

The underlying principle of the DSL repeater is the need to combat the loss in the actual cable (subscriber loop). This is achieved by introducing gain. Since amplifiers are for the most part uni-directional devices, one approach is to perform a 2w-to-4w conversion and put amplifiers in each direction. This is most easily achieved when the directions of transmission are in disjoint spectral bands. The direction of transmission are in disjoint spectral bands if the directions of transmission are separated in frequency (i.e. frequency-division duplexing), then simple filter arrangements can provide the separation.

Most loop plant provide for access to the cable, which may be buried underground, approximately every 6000 feet. This was the practice to allow for the provision of load coils. Thus the natural separation between repeaters is (approximately) 6000 feet. The repeater may be placed in parallel with a load coil if the DSL needs to coexist with POTS.

Referring to FIG. 1, a general architecture for providing an asymmetric digital subscriber loop (ADSL) is depicted. A subscriber loop is the actual two-wire copper pair that originates at the Central Office and terminates at the subscriber's premise. For providing ADSL over long loops, an ADSL repeater, 100, may be included. At the customer premise the handset (POTS) is "bridged" onto the subscriber loop at point labeled S1. In some forms of ADSL this bridging can be achieved using passive filters (called a "splitter") to demarcate the frequency bands where voice and data reside. Similarly, a splitter may be employed at the central office (CO) at point S2. Central office equipment that interfaces to ADSL provisioned lines is often embodied as a multiplexer called a "DSLAM" (Digital Subscriber Line Access Multiplexer). The data component is aggregated into an optical or high-bit-rate signal for transport to the appropriate terminal equipment. The capacity of ADSL allows for additional voice circuits (shown as VF in FIG. 1) to be carried in digital format as part of the ADSL data stream. This content is usually (though not always) destined to a Class-5 switch.

The term approximately, as used herein, is defined as at least close to a given value (e.g., preferably within 10% of, more preferably within 1% of, and most preferably within 0.1% of. The term coupled, as used herein, is defined as connected, although not necessarily directly, and not necessarily mechanically. The term substantially, as used herein, is defined as at least approaching a given state (e.g., preferably within 10% of, more preferably within 1% of, and most preferably within 0.1% of).

Given that a large installed loop plant exists, the invention can include retrofit installation. Part of the retrofit installation procedure involves removal of all load coils, and bridge-taps that may be present on the (existing) subscriber loop. Based on telephone company records, the (approximate) distance between the subscriber premise and the serving Central Office can be estimated to decide whether DSL can be provided in the first place. If DSL can indeed be provided, an estimate of the class (and thus the data carrying capacity) is made. If not, then the telephone company may choose to provide a lower bit-rate service such as BRI or, in some cases, not be able to provide any service beyond POTS.

Signals from both directions can coexist on the cable pair and such transmission is referred to as "2-wire". This form is perfectly adequate for analog signals (speech). In digital transmission systems the two directions are separated (logically, if not physically) and such transmission is termed "4-wire". Two common approaches to achieving this action are "echo canceling" and frequency-division-duplexing ("FDD"). Both approaches can be supported by the DMT method.

Figure 2:
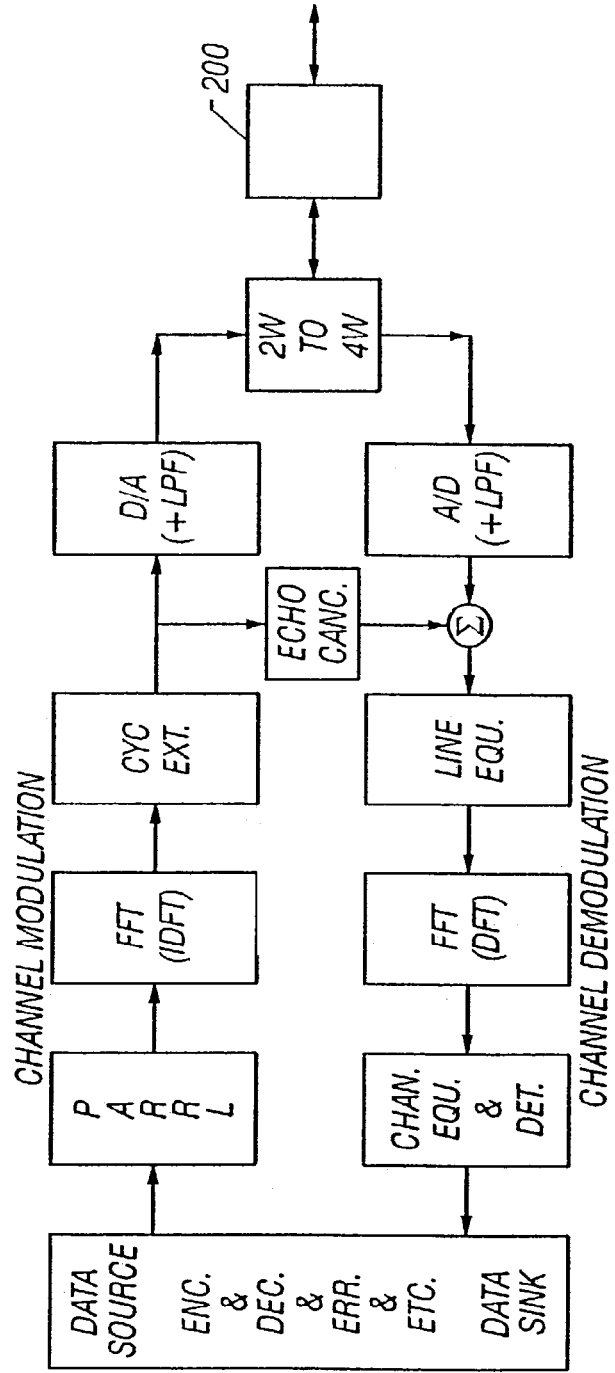
FIG. 2 illustrates a block schematic view of the more important elements of a DMT signal processing flow (echo canceling mode), representing an embodiment of the invention.

Referring to FIG. 2, a signal processing flow in a DMT-based ADSL transmission unit ("ATU") that employs echo cancellation is depicted. The transmit ("modulation" direction) side is considered first. The data to be transmitted is first processed to include error correction by a ENC. & DEC. & ERR. & ETC. unit. It is then formatted into multiple "parallel" channels via a PARRL processing unit. It is then placed in the appropriate frequency slot via a FFT processing unit. The notion of "cyclic extension" is unique to DMT and involves increasing the sampling rate by insertion of additional samples via a CYC. EXT. processing unit. This composite signal is converted to analog via a D/A converter and coupled to the line via a 2 w-to-4 w converter. An ADSL repeater 200 is coupled to the 2w-to-4w converter.

Ideally the entire signal from the D/A converter is transmitted to the distant end via the 2 w-to-4 w converter. However, in practice some amount "leaks" from the 2 w-to-4 w converter toward a A/D converter. This leakage can be termed the "echo.", The receive side ("demodulation" direction) is now considered. The signal from the distant end arrives at the 2 w-to-4 w converter via the repeater 200 and is directed to the A/D converter for conversion to digital format. Subsequent processing includes line equalization via the LINE EQU. unit, fast Fourier transformation via the FFT unit and then channel equalization and data detection via the CHAN. EQU. & DET. unit. Processing is then handed to the unit that does the error detection and/or correction and reorganizing into the appropriate format. To remove the echo (the component of the transmit signal that leaks across the 2 w-to-4 w converter) an echo cancellation filter is employed. This is a digital filter that mimics the echo path and thus the output of the filter labeled "Echo Canc" is a "replica" of the echo and by subtraction of this signal from the received signal at a summation unit, the net echo can be substantially reduced. Thus 4 w operation is achieved even though the medium is merely 2 w. The spectral content of signals in the two directions can have significant overlap but are sufficiently separated by the echo cancellation technique.

Figure 3:
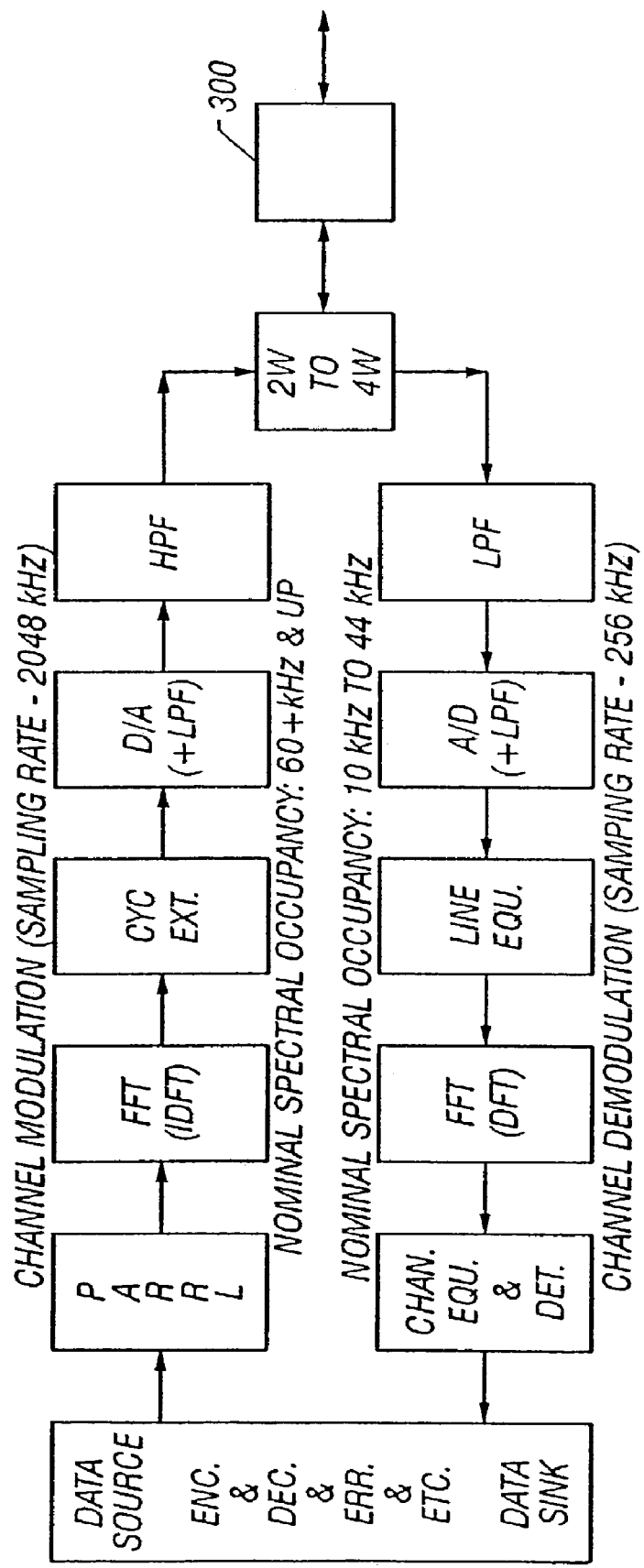
FIG. 3 illustrates a block schematic view of a frequency-division duplexing mode for DMT-based ADSL (central office end shown), representing an embodiment of the invention.

Referring to FIG. 3, a frequency-division duplexing (FDD) mode of DMT for ADSL is depicted. The "back-end" of the FDD version of DMT-based ADSL is substantially the same as the echo-canceling version illustrated in FIG. 2.

Referring again to FIG. 3, the frequency range used for Upstream versus Downstream is vendor specific. Standards-compliant ADSL uses a total bandwidth of roughly 20 kHz to 1.1 MHz. In a preferred embodiment, the upstream occupies between 20 kHz and X, kHz whereas the downstream signal occupies the band between $X_2$ kHz and 1.1 MHz. $X_2$ should be substantially greater than X, to allow for frequency roll-off of the filters used to demarcate the upstream and down-stream bands. One suitable choice is $X_1=80$ kHz and $X_2=160$ kHz. The specific choice of these band edges can be made a design parameter and different "models" of the repeater can be fabricated with different choices of band edges.

Still referring to FIG. 3, a high pass filter HPF unit is coupled to the D/A units. A 2 w-to-4 w converter is coupled to the HPF unit. The 2 w-to-4 w converter is also coupled to a low pass filter LPF unit which is in-turn coupled to the A/D unit. An ADSL repeater 300 is coupled to the 2 w-to-4 w converter.

The underlying principle of the ADSL Extender is the need to combat the loss in the actual cable (subscriber loop). This is achieved by introducing gain. Since amplifiers are for the most part unidirectional devices, we need to, in essence, perform a 2 w-to-4 w conversion and put amplifiers in each direction. This is most easily achieved when the directions of transmission are in disjoint spectral bands. That is, if the directions of transmission are separated in frequency (i.e. frequency-division duplexing), then simple filter arrangements can provide the separation.

Most loop plant provide for access to the cable, which may be buried underground, approximately every 6000 feet. This was the practice to allow for the provision of load coils. Thus, the natural separation between repeaters is (approximately) 6000 feet. The Repeater may be placed in parallel with a load coil if the ADSL needs to coexist with POTS.

Figure 4:
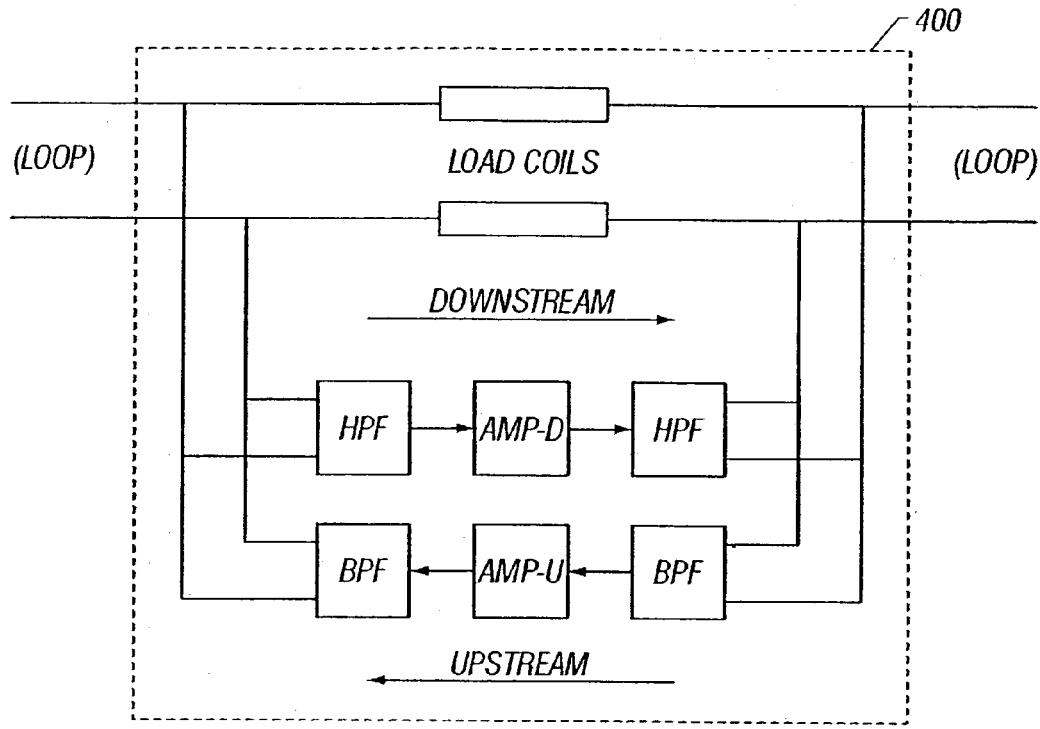
FIG. 4 illustrates a block schematic view of an exemplary asymmetric digital subscriber loop repeater, representing an embodiment of the invention.

The particular description of an ADSL Repeater provided in FIG. 4 is suitable for the DMT-based ADSL transmission scheme employing frequency-division duplexing (FDD). The form discussed assumes that POTS and ADSL will coexist (simultaneously). Of course, the invention is not limited to this ADSL FDD example.

Referring to FIG. 4, an outline of the functional blocks in an ADSL repeater 400 are depicted. For convenience certain functions such as power and control are not shown in FIG. 4. Power and control units can be coupled to the ADSL repeater 400. Although not required, two load coils are shown as part of the repeater 400. When load coils are deployed in a loop, the loop is split and the load coils are spliced in as indicated by the series connections of the inductors (load coils) with the loop. This can be termed in line with loop.

The load coils provide a very high impedance at high frequencies and thus for the range of frequencies where ADSL operates the load coils look essentially like open circuits.

The 2 w-to-4 w arrangement is not explicitly shown in FIG. 4 but is implied. Since the two directions are separated in frequency, the 2 w-to-4 w arrangement can be quite simple. A bandpass filter BPF isolates the frequency band from 10 kHz to 44 kHz (approximately) and thus the upstream signal is amplified by an amplifier AMP-U. In this particular example, the gain introduced can compensate for the attenuation introduced by approximately 6000 feet of cable at 27 kHz (or approximately the middle of the band). The highpass filters HPF separates out the band above 60 kHz (approximately) and thus the downstream signal is amplified by an amplifier AMP-D. Again, in this particular example, the gain introduced compensates for the attenuation of approximately 6000 feet of cable at 600 kHz (again, roughly the middle of the band).

Since the frequency response of the cable is not "flat" the amplifiers can be designed such that, in conjunction with the filters, they provide a rough amplitude equalization of the cable response over the appropriate frequency band, for example, approximately 10 kHz to 44 kHz upstream and approximately 60 kHz to 1 MHz downstream. The choice of frequency bands is, preferably, 20 kHz to 80 kHz for the upstream direction and 160 kHz to 1.1 MHz for the downstream direction.

If POTS need not be supported, then the load coils are superfluous and can be left "open". Further, if the need for load coils is obviated, the separation of the units becomes a design parameter, independent of load coil placement. A suitable separation of Extenders in this situation is between 7 and 12 kft, and the unit can then be referred to as a "Mid-Span Extender". Clearly, the gains required for the mid-span extender are commensurate with the expected separation.

An ADSL Repeater is well suited for providing ADSL services over long loops which may have been precluded based on loop length and presence of load coils. As described it is a simple mechanism for amplifying the upstream and downstream signals, compensating for the loss in the subscriber loop cable. Separating repeaters by approximately 6000 feet is appropriate since this the nominal distance between points on the cable where load coils were introduced in the past. Cross-over networks based on highpass and bandpass filters can define the upstream and downstream bandwidths used by the DMT-based ADSL units at the CO and CPE operating in a frequency-division duplex mode.

Installing equipment in the cable plant introduces two important considerations. One is the need to provide power. The second is to provide the means to verify operation and isolate problems.

Subscriber loop cable usually comes in bundles of 25 pairs. That is each bundle can provide service to 25 telephone lines. One embodiment of the invention can use the 25 pairs to provide just 20 ADSL connections. This leaves 4 pairs to carry power for the repeaters, and 1 pair to carry control information.

Each 25-pair "repeater housing" can include one controller (microprocessor) and modems that convert the digital control information to (and from) analog for transport over the control pair. These controllers can operate in a "daisy chain" which allows the central office end to query for status, or control the operation of, any repeater housing in the path. For long loops, those exceeding 18 thousand feet, there may be as many as 4 or 5 (or more) repeater housings connected in series (approximately 6000 feet apart). The control information will include commands for maintenance and provisioning information.

The provisioning information relates to the mode of operation of each of the 20 pair of cable that carry ADSL. One mode is "normal", where the repeater is operating and the load coils are in the circuit. Another mode is "no-ADSL-repeater" wherein the repeaters are not part of the circuit. This latter mode has two "sub-modes". The load-coils may be in the circuit or be removed. The last sub-mode is appropriate if the loop is actually short and we do not need the repeaters and the load coils need to be removed. Of course, other modes of operation can be conceived of.

For test and maintenance purposes, the central office end needs to be capable of forcing any one chosen repeater (on the subscriber loop under test) to enter a loop-back state. That is, a test signal sent from the central office is "looped back" at the chosen repeater and the condition of the loop up to that chosen repeater can be validated. Other test and maintenance features must be provided to support the operating procedures of the phone company.

For providing loop-back through the repeater, the following approach can be used. It can be appreciated that the upstream and downstream signal bands are disparate and non-overlapping. Thus, the notion of loop-back is not simple. One approach can use a two-tone test signal that is within the downstream spectral band. For example, the tone frequencies could be 200 kHz and 250 kHz. When commanded to go into loop-back, the designated repeater introduces a nonlinear element into the circuit. The nonlinear element will create different combinations of the sums and difference frequencies. In particular, the nonlinear element can generate the difference frequency, 50 kHz in the example cited. This signal is within the frequency band of the upstream direction and thus can be looped back. The Central Office end can monitor the upstream path for this (difference) frequency and thus validate the connectivity up to the repeater in loop-back state.

The form of extender where load coils are not being replaced is the Mid-Span Extender. Placement of a Mid-Span Extender is not constrained by the placement of load coils but, as a matter of practice, the phone company usually has a manhole or equivalent construction where load coils are (normally) situated and these locations would be logical places for deployment of a Mid-Span Extender as well. When a mid-span extender is employed, the load coil removal would follow normal telephone company practice.

Figure 5:
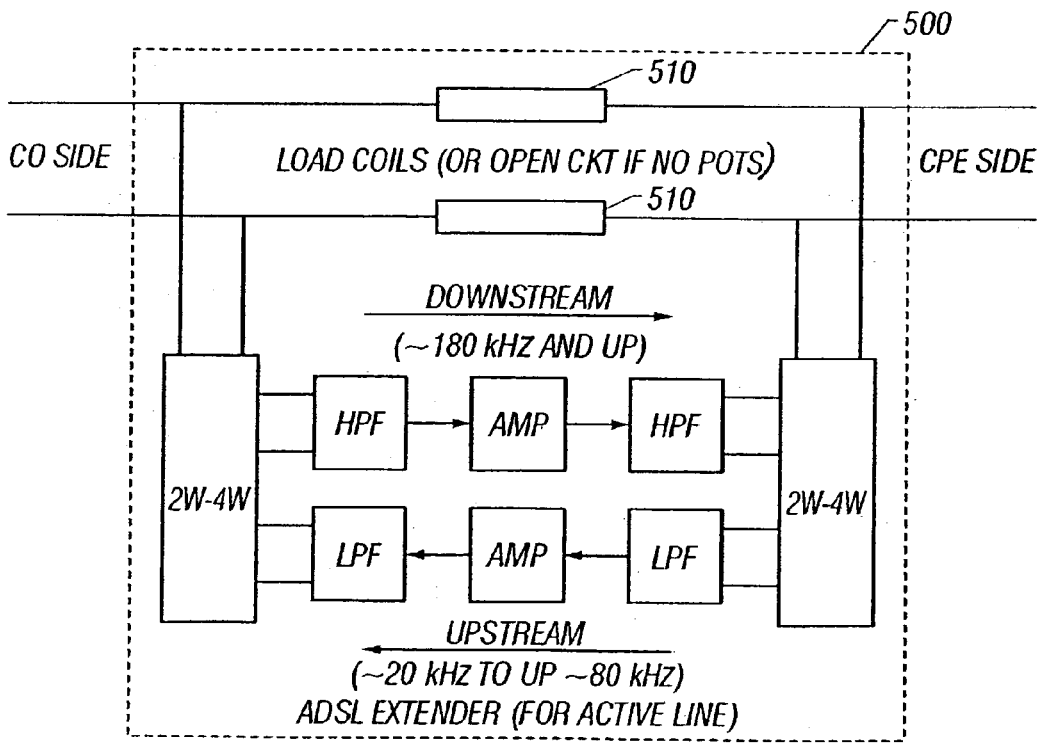
FIG. 5 illustrates a schematic block view of an outline of an extender circuit, representing an embodiment of the invention.

The basic circuit outline 500 of the Extender unit is shown in FIG. 5. The extender unit includes a first 2 w–4 w and a second 2 w–4 w. For the case of a "load coil replacement", the 88 mH inductors 510 would be present and the gains adjusted for compensating for (roughly) 6000 feet of cable. The same circuit arrangement would apply to the mid-span extender case wherein the 88 mH coils would not be present and the gains adjusted for X feet of cable (X could be in the neighborhood of 10,000 feet).

The following section describes relevant aspects of the DMT "data pump". This is to compare and contrast the standardized data pump with the (non-standardized) data pump proposed herein. The essence of the new ADSL method is a better data pump, more in line with the notion of long loop behavior than the standard DMT. In particular, the new ADSL method is very well suited for modems (the ATU-R and the ATU-C) in situations where an ADSL extender (mid-span or at load coil locations) is utilized.

To understand the principle of the DMT data pump, consider the following situation. Suppose we have N(complex) samples $\{x(n); n=0,1,2,\ldots,(N\_1)\}$. We can compute the (inverse) Discrete Fourier Transform (DFT) of this block of samples as $\{y(k); k=0,1,2,\ldots,(N\_1)\}$ as indicated in Eq. (2.4.1).

$$y(k) = \frac{1}{N} \sum_{n=0}^{n=(N-1)} x(n) \cdot e^{+j2\pi\left(\frac{n \cdot k}{N}\right)} \qquad \text{(Eq. 2.4.1)}$$

Since the DFT is invertible, we can recover the original sample set, $\{x(n)\}$ from the set $\{y(k)\}$ using the (forward) DFT.

$$x(n) = \sum_{k=0}^{k=(N-1)} y(k) \cdot e^{-j2\pi\left(\frac{n \cdot k}{N}\right)} \qquad \text{(Eq. 2.4.2)}$$

That is, the process of performing the IDFT ("Inverse DFT") and then the DFT gives back the original set of samples. In DSP literature, we sometimes do not make a big distinction between the inverse and forward DFTs because they are so similar and we use FFT (Fast Fourier Transform) algorithms in either case and all FFT algorithms are geared to implement either form of DFT.

Figure 6:
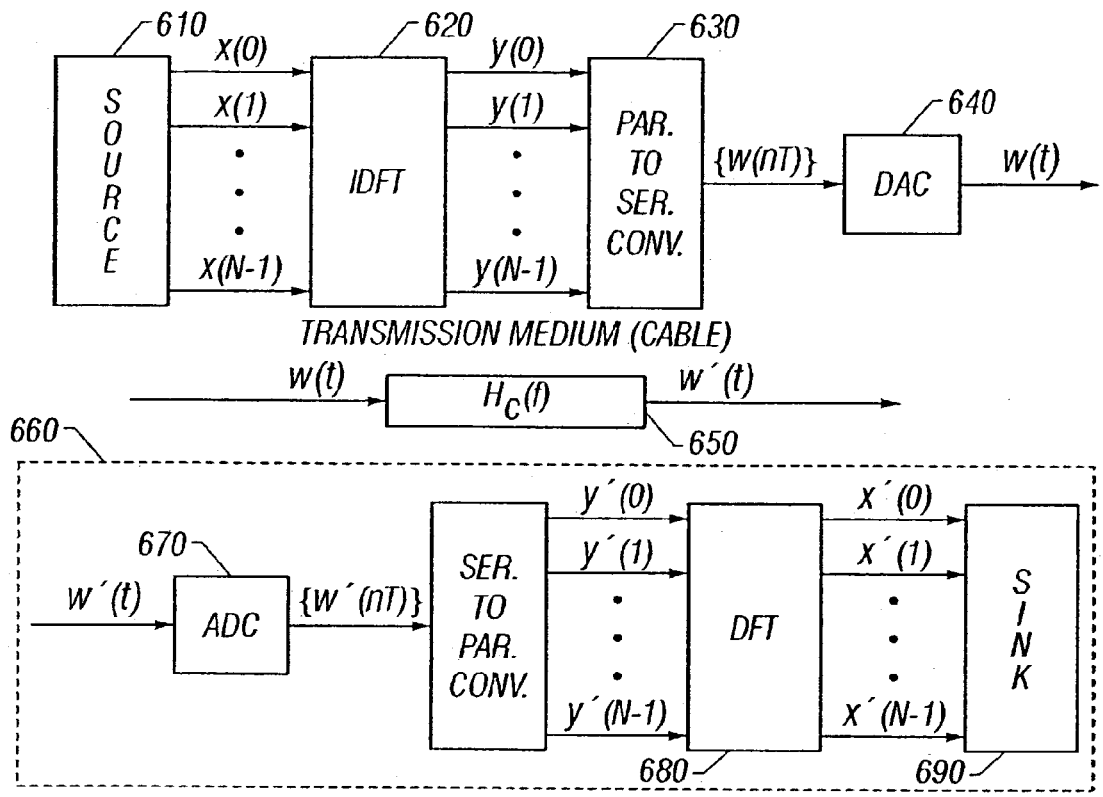
FIG. 6 illustrates a schematic block view of the principle of a DMT data pump, representing an embodiment of the invention.

An extension of this idea is depicted in FIG. 6, below. Here we assume that a "Source" 610 generates a block of N samples called $\{x(n); n=0,1,2,\ldots,(N\_1)\}$ which are processed using an inverse DFT 620 calculation (i.e. a complex matrix multiplication) to yield $\{y(k); k=0,1,2,\ldots,(N\_1)\}$. These samples are converted into a serial word stream, $\{w(nT)\}$, at an effective sampling rate, $f_s$ (=1/T), of N times the rate at which the source generates blocks of samples by a parallel to serial converter 630, and converted into analog form using a digital-to-analog converter (DAC) 640. This analog signal traverses the transmission medium 650, namely the cable, and at the receiver 660 is converted into digital format at sampling rate $f_s$ to yield samples $\{w'(nT)\}$. The reverse process of conversion from serial-to-parallel is followed by a DFT calculation 680.

If we assume that the transmission medium is very wide-band and thus does not affect the signal, and that there is no additive noise (interference), and if we can compensate for any transmission delay between the DAC 640 and ADC 670, then we can, in principle, synchronize the DAC 640 and ADC 670 in a manner that $w(nT) \sim w'(nT)$. That is, the serial stream of samples from the ADC 670 matches the serial stream of samples provided to the DAC 640. In this situation, each block (parallel set) of samples $\{x'(n); n=0,1,2,\ldots,(N\_1)\}$ provided to the "SINK" 690 will be nominally the same as the block (parallel set) of samples generated by the "SOURCE" 610. This is the underlying premise for the DMT. Each block of N samples can be viewed as a "symbol" and the symbol rate is the rate at which blocks (i.e. symbols) are generated for transmission. The sampling rate of the DAC 640 and the corresponding ADC 670 is N times this symbol rate. In the ADSL DMT standard the symbol rate is specified as 4 kHz. Thus in an ideal situation, the transmitted symbol (from the "SOURCE" 610) will be received "intact" by the receiving entity (the "SINK" 690).

Visualizing the DMT data pump as a scheme for transmitting blocks, or symbols, is appropriate if there were no transmission medium to contend with. A different viewpoint can be developed that describes more fully the action of the DMT scheme. To this end we view the sequence of N-sample symbols (blocks) as N "independent" channels wherein each channel has a sampling rate equivalent to the block rate (symbol rate), namely 4 kHz. It can be shown (see Ref. [6]) that the action of the IDFT can be viewed as a combination of interpolation, filtering and frequency translation.

That is, suppose we change our notation from $\{x(k)\}$, which indicates a single symbol with k representing the index within the symbol, to $\{x_k(mNT)\}$. Here the symbol interval is NT (since the notion of T is the sampling interval at the increased sampling rate, $f_s$, then NT is the notion of the sampling interval at the lower sampling rate, namely the symbol rate) and the subscript k indicates the position of the sample within the symbol. Then $x_k(mNT)$ represents the sample value of the k-th channel at time epoch corresponding to the m-th symbol. The combination of IDFT and parallel-to-serial conversion depicted in FIG. 6 is equivalent to the signal processing flow graph shown in FIG. 7.

Figure 7:
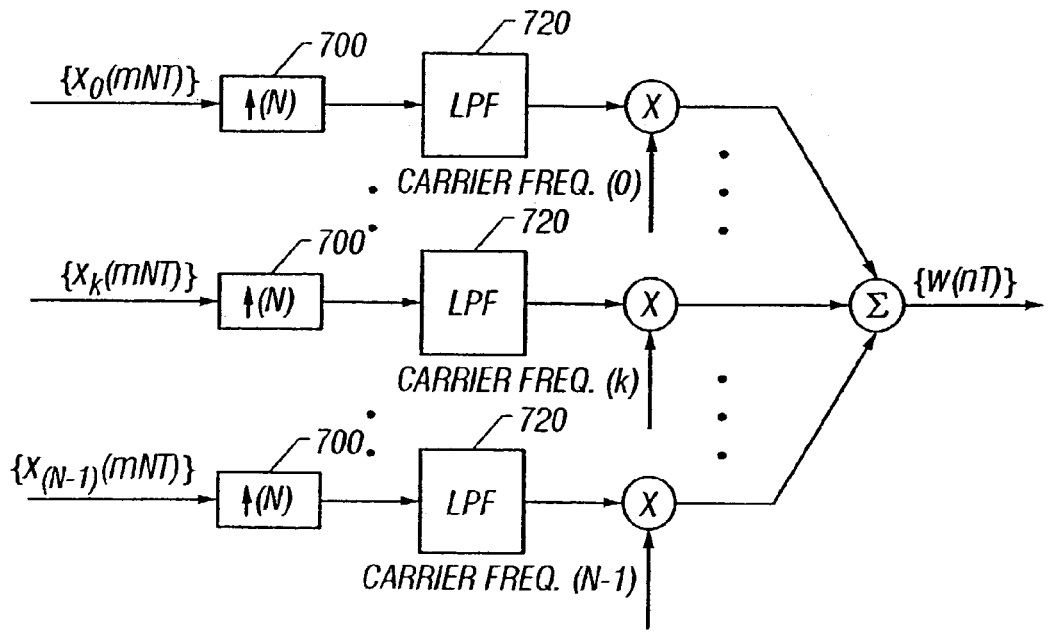
FIG. 7 illustrates a schematic block view of a signal processing equivalent of IDFT computation followed by serial-to-parallel-conversion, representing an embodiment of the invention.

In FIG. 7, the block 700 with the up-arrow and "(N)" indicates the process of over-sampling or up-sampling. The sampling frequency is increased by a factor of N by the insertion of zero-valued samples. In the frequency domain, this action is equivalent to the creation of spectral replicates. That is, the base-band spectrum is replicated at center frequencies of the form $(kf_s/N)$ where k ranges from 0 (i.e., the base-band itself) through (N_1). The low-pass filter 720, "LPF", then "removes" all the replicates. The extent to which these replicates are attenuated depends on the frequency response of the low-pass filter 720. The low-pass filter output is representative of the input signal at the increased sampling rate, $f_s$. This LPF-output signal is then modulated (frequency-translated) by the appropriate carrier frequency. It can be shown that the N carrier frequencies are of the form $(kf_s/N)$ where k ranges from 0 through (N_1).

In the DMT scheme the "channel separation filter", which is nominally equivalent to the LPF 720 in FIG. 7, is equivalent to a "rectangular window". That is, the LPF is an FIR filter ("FIR"=Finite Impulse Response) with impulse response given by $\{h(n); n=0,1, \ldots ,(N-1)\}$ where all N coefficients are equal and for purposes of establishing frequency response can be assumed to be unity. The frequency response can be computed as $$h(n) = 1; n = 0, 1, \ldots, (N-1) \quad \text{(Eq. 2.4.3)}$$

$$H(f) = \frac{\sin\left[N\pi\left(\frac{f}{f_s}\right)\right]}{\sin\left[\pi\left(\frac{f}{f_s}\right)\right]}; f_s = \text{sampling frequency}$$

The frequency response curve is of the (the digital equivalent of) "sin-x-by-x" form. As low-pass filters go it is not a very "good" response. It has transmission zeros at multiples of $(f_s/N)$ but between transmission zeros the stop-band attenuation is not that much, as little as 13 dB (approximately) close to the pass band, which is nominally up to $0.5(f_s/N)$, but improving as the frequency is increased. One would expect that with such a weak low-pass filter, there would be significant inter-channel cross-talk. However, the DMT scheme can introduce a clever mechanism to reduce this perceived impairment.

Figure 8:
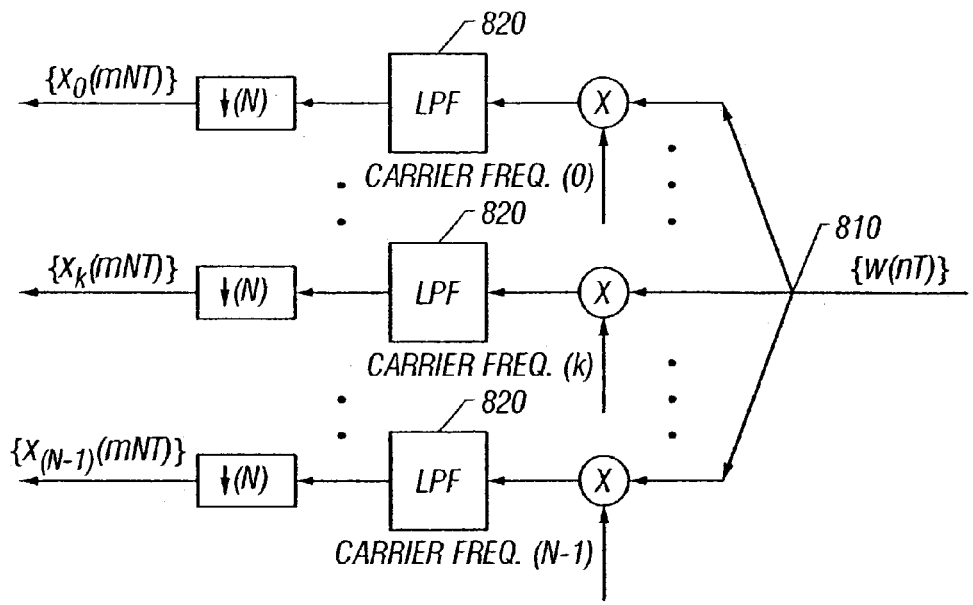
FIG. 8 illustrates a schematic block view of a signal processing equivalent of (serial-to-parallel-conversion) followed by DFT computation, representing an embodiment of the invention.

Before we describe this technique, consider the implication of modeling the transmitter by the signal flow graph of FIG. 7. If the LPF 720 blocks were indeed good low-pass filters, then the scheme is equivalent to Frequency Division Multiplexing (FDM). Each sub-channel (distinguished via the subscript k) can be considered "independent" of any other sub-channel and occupies its own frequency slot of bandwidth (nominally) $(f_s/N)$. Further, it can be shown that the processing in the receiver, comprising the serial-to-parallel conversion followed by the DFT, is equivalent to the logical "inverse" of FIG. 7. That is, the receiver does the demultiplexing function. This is depicted in FIG. 8. Note the similarity between FIG. 7 and FIG. 8. From a Signal Processing viewpoint, the multiplexing and demultiplexing functions are "dual" operations. In fact, we can "derive" FIG. 8 from FIG. 7 by replacing the summation node with a branch point 810 and reverse the direction of the signal flow. That is, the incoming signal is processed in parallel by a bank of frequency translators followed by low-pass filters 820 followed by the reduction in sampling rate by a factor of N. In the literature the configuration of FIG. 8 is referred to as a "maximally decimated filter-bank" because the under-sampling factor (i.e., N) is equal to the number of channels and thus the overall number of samples per second is the same for the set of N sub-channels versus the combined signal.

Thus, logically speaking, we have N "independent" channels, each occupying a bandwidth of (fs/N) with its own "center frequency". Assuming that this bandwidth is small, the effect of the intervening cable then can be modeled as a straightforward (complex) gain, that is, for all practical purposes, "flat" over this narrow band. Thus we do not need complicated equalization methods for equalizing the cable frequency response, just flat-gain equalization for each of the sub-channels.

The approach of using filter-banks that combine the filtering and modulation is not new. Ref [7] is the original patent for the "Transmultiplexer" which provided just the functionality described, namely combination of several "low-speed" (i.e., low- sampling rate) channels into a single "high-speed" (i.e., high sampling rate) channel and vice-versa. The equivalent problem of taking a single high-speed signal and splitting it into several low-speed signals and then recombining them back into the high-speed signal (without losing information) has been addressed in the theory of filter-banks and [8] is a comprehensive reference for this topic.

The DMT data pump principle is a clever method to overcome the "non-ideal" nature of the implied low-pass filter. The principle is based on the following property of the Discrete Fourier Transform (DFT). Suppose $\{x(n); n=0,1,\ldots,(N\_1)\}$ and $\{h(n); n=0,1,2,\ldots,(N\_1)\}$ are two N-point sequences and $\{y(n), n=0,1,\ldots,(N\_1)\}$ is a third N-point sequence that is the circular convolution of the first two N-point sequences. That is, $$y(n) = \sum_{k=0}^{k=(N-1)} h(k) \cdot x((n-k)); \text{ where} \quad \text{(Eq. 2.4.4)}$$

$$((n-k)) = (n-k)_{modulo(N)}$$

Note that circular convolution is similar to regular-convolution except that the indices are constrained to lie in the range 0 through (N−1) using the modulo(N) operation to map integers outside this range into this range. If we denote by $\{X(k); k=0,1,2, \ldots, (N\_1)\}$, $\{H(k); k=0,1,2, \ldots, (N\_1)\}$, and $\{Y(k); k=0,1,2 \ldots, (N\_1)\}$, the DFTs of the three N-point sequences $\{x(n); n=0,1, \ldots, (N\_1)\}$, $\{h(n); n=0,1,2, \ldots, (N\_1)\}$ and $\{y(n); n=0,1, \ldots, (N-1)\}$, respectively, then the transform-domain equivalent of Eq. (2.4.4) is given by $$Y(k)=X(k) \cdot H(k); k=0,1,2, \ldots, (N-1) \quad \text{(Eq. 2.4.5)}$$

That is, the DFT transforms circular convolution in the "time-domain" to multiplication in the "frequency-domain".

Now with reference to FIG. 6, we could model the combination of the DAC 640, cable response, $H_c(f)$, and the ADC as a digital filter with impulse response $\{h_c(n); n=0, 1,2, \ldots\}$ This digital filter will be, in general an infinite impulse response (IIR) filter. The relationship between $\{w(n)\}$ and $\{w'(n)\}$ can be expressed as the (true) convolution as shown in Eq. (2.4.6) [we have dropped the T for notational convenience].

$$w'(n) = \sum_k w(n-k) \cdot h_c(k) \quad \text{(Eq. 2.4.6)}$$

In Eq. (2.4.6) the range of the index k encompasses all the non-zero elements of the impulse response $\{h_c(n)\}$ which, in general, is an infinite range, from 0 to ∞ (infinity). Note that even if the range were finite, the convolution is not a circular convolution and thus the transform-domain equivalent, assuming we use the DFT, does not follow Eq. (2.4.5). Recognizing that if $\{w(n)\}$ is periodic, then the regular convolution of Eq. (2.4.6) does indeed reduce to a circular convolution, the approach taken in the DMT data pump is to mimic a periodic behavior.

Suppose the effective cable impulse response was indeed finite in duration, say K samples long. That is, $h_c(n)=0$ for $n=K, (K+1), (K+2), \ldots$ We modify the "parallel-to-serial" conversion from the regular, conventional, method to one in which we introduce a periodic extension. That is, from the N "parallel" samples $\{x(0), x(1), \ldots, x(N\_1)\}$ we generate (N+K\_1) "serial" samples by creating $\{x(N\_K+1), x(N\_K+2), \ldots, x(N\_), x(0), x(1), \ldots, x(N\_1)\}$. This periodic extension is also called a "cyclic prefix". With this cyclic prefix, we can see that if we take the regular convolution of these (N+K\_1) sequential samples with the finite impulse response $\{h_c(n)\}$, and examine the latter N samples of the (regular) convolution, we get ignore the rest. Here we have indicated the time-interval between samples for w'(t) as T' since the effective sampling rate of the ADC and DAC is greater by a factor of (N+K\_ 1)/N because of the inclusion of the cyclic prefix.

The inclusion of the cyclic prefix allows us to model the filtering action of the cable as being cyclic convolution, rather than regular convolution. This modeling is appropriate if (and only if) the effective cable impulse response is FIR with an impulse response length less than the size of the cyclic prefix. In the actual DMT ADSL standard, a special equalization procedure is mandated which "equalizes" the cable to the extent that, in conjunction with the equalizer, the effective impulse response is FIR.

The following section describes an even better approach to achieving the data pump, one that is better suited for long loop ADSL and which will work efficiently in conjunction with the Long Loop ADSL Extender mechanism. The principle underlying this improved method is actually quite old, predating the DMT ADSL standard by several years. In fact it has been used in a product called a "Transmultiplexer" which does a bilateral conversion between analog FDM (Frequency Division Multiplexing) and digital TDM (Time Division Multiplexing) and covered in two patents that were issued in 1978 and 1980 (see Ref. [7]).

The improved data pump is based on the principle of the Digital Filter Bank used in the Transmultiplexer. Specifically, it calls for improved filters, compared to the DMT scheme, in the configurations depicted in FIG. 7 and FIG. 8. Furthermore, we show that even though the computational burden for such filters would be greater than the computational burden in the case of the DMT ("Rectangular Window" low-pass filter), the overall computational burden is less and furthermore, the need for increasing the speed of the ADC and DAC by the factor of (N+K\_1)/N is obviated.

The filter bank principle allows for filter lengths longer than N (the size of the DFT) and thus we can provide for filter characteristics that are superior to that of the N-point rectangular window called out in the DMT standard. Having a better filter characteristic implies that the channel separation is more robust and thus we do not have to resort to the cyclic prefix extension of the DMT. In particular, the filter bank principle details how a filter of length R·N can be applied. Details can be found in references [5] through [8]. Simply put, the extended length R·N can be implemented as N separate R-point FIR filters. In the "modulate" direction whereby N sub-channels are combined, the mini-FIR filters, also referred to as a "weighting network", is positioned after $$w'(K) = h_c(0) \cdot x(0) + h_c(1) \cdot x(N-1) + \ldots + h_c(K-1) \cdot x(N-K+1)$$
$$w'(K+1) = h_c(0) \cdot x(1) + h_c(1) \cdot x(0) + \ldots + h_c(K-1) \cdot x(N-K+2)$$
$$\vdots$$
$$w'(K+N-1) = h_c(0) \cdot x(N-1) + h_c(1) \cdot x(N-2) + \ldots + h_c(K-1) \cdot x(N-K)$$

(Eq. 2.4.7)

Denote the N samples of w'(n) for index n ranging from K through (N+K\_1) by $\{v(n), n=0,1,2, \ldots, (N\_1)\}$. Then examination of Eq. (2.4.7) indicates that we can identify this N-point sequence as the circular convolution of the "input" sequence $\{x(0), x(1), \ldots, x(N\_1)\}$ and the (FIR) impulse response $\{h_c(n)\}$. Thus, when we do the serial-to-parallel conversion, we choose the appropriate N consecutive samples of $\{W'(nT')\}$ from a block of (N+K−1) samples and the IDFT and the outputs of the N (parallel) R-point filters is converted from parallel to serial. In the "demodulate" direction, where the N sub-channels are extracted from the aggregate, the N R-point filters are positioned after the serial to parallel conversion and before the DFT computation. It can be shown that "R" does not have to be the same for the modulation and demodulation processing but it is usual to have the same length filter for both operations. The ratio, R, of the length of the DFT (N) and length of the filter (R.N), can be referred to as "the number of active taps".

Figure 9:
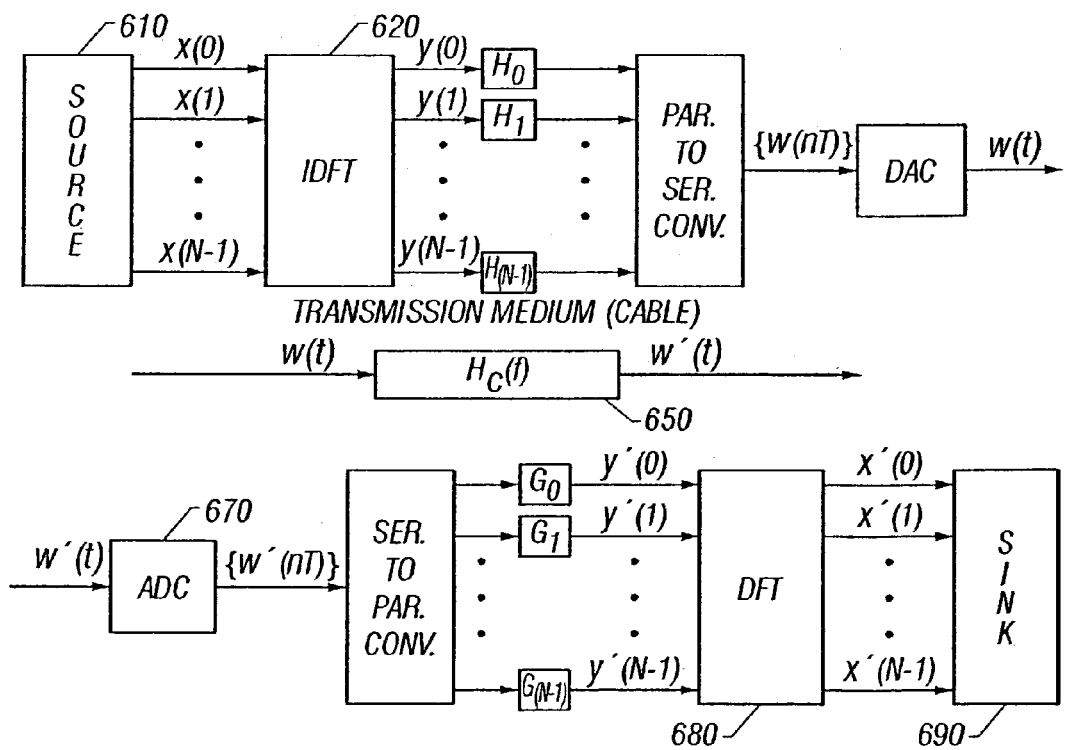
FIG. 9 illustrates a schematic block view of an improved data pump, representing an embodiment of the invention.

In FIG. 9 we show how the scheme depicted in FIG. 6 is modified to accommodate the longer filters for channel delineation. In the most general case the filters labeled "H" in the modulator and "G" in the demodulator could be derived from different "prototype" filters but in most cases the same design is used for both operations. We shall assume that "H" and "G" are the same for this discussion. We show the derivation for the demodulation operation here.

The derivation for the modulation operation is similar. More detail is available in references [5] through [8].

Consider that in FIG. 7 the same low-pass filter design is used for all N sub-channels.

Denote this R·N length FIR filter as $\{h_p(n); n=0,1,2, \ldots, (RN\_1)\}$. This filter is considered the "prototype" filter because it is applicable to all channels. The parameter "R" is "the number of active taps", a term which will be self-explanatory shortly but follow from the fact that the filter length is R times the size of the DFT that we will use. The signal for the $k^{th}$ sub-channel, at the high sampling rate can be expressed as $$x_k(nT) = \sum_{m=0}^{RN-1} h_p(m) \cdot w((n-m)T) \cdot e^{-j2\pi(n-m)\frac{k}{N}} \quad \text{(Eq. 3.1.1)}$$

where we have taken into account that the frequency translation of $\{w(nT)\}$ by the $k^{th}$ carrier is achieved by multiplying by the complex exponential term.

The RN-point prototype filter can be split into N R-point filters in the following manner:

$$h_k(m) = h_p(mN+k); \; m=0,1,2,\ldots,(R-1);$$
$$k=0,1,2,\ldots,(N-1) \quad \text{(Eq. 3.1.2)}$$

The N R-point filters are seen to have impulse responses corresponding to the N different phases whereby the impulse response of the prototype filter can be under-sampled by a factor of N. In Eq. (3.1.1) we can split the index m which runs from 0 through (RN_1) into a double index in a manner suggested by Eq. (3.1.2) and get:

$$x_k(nT) = \quad \text{(Eq. 3.1.3)}$$
$$\sum_{\mu=0}^{N-1} \sum_{m=0}^{R-1} h_p(mN+\mu) \cdot w((n-mN-\mu)T) \cdot e^{-j2\pi(n-mN-\mu)\frac{k}{N}}$$

If, further, we recognize that the output of each sub-channel is re-sampled (under-sampled by a factor of N) at the lower sampling rate (4 kHz), only every N-th sample of $\{x_k(nT)\}$ needs to be computed. Therefore, $$x_k(nNT) = \sum_{\mu=0}^{N-1} \left( \sum_{m=0}^{R-1} h_\mu(m) \cdot w((n-m)N-\mu) \right) \cdot e^{j2\pi\mu\frac{k}{N}} \quad \text{(Eq. 3.1.4)}$$

Examination of Eq. (3.1.4), specifically the inner parentheses, indicates that we do N R-point FIR filters operating on the N separate phases of under-sampling the signal $\{w(nT)\}$ by a factor of N. Further, the outputs of these N "sub-filters" are combined using a computation of the DFT form to yield the N sub-channel outputs ("simultaneously"). This is the theory of the digital filter bank. A similar treatment yields the dual result for the other direction.

Figure 10:
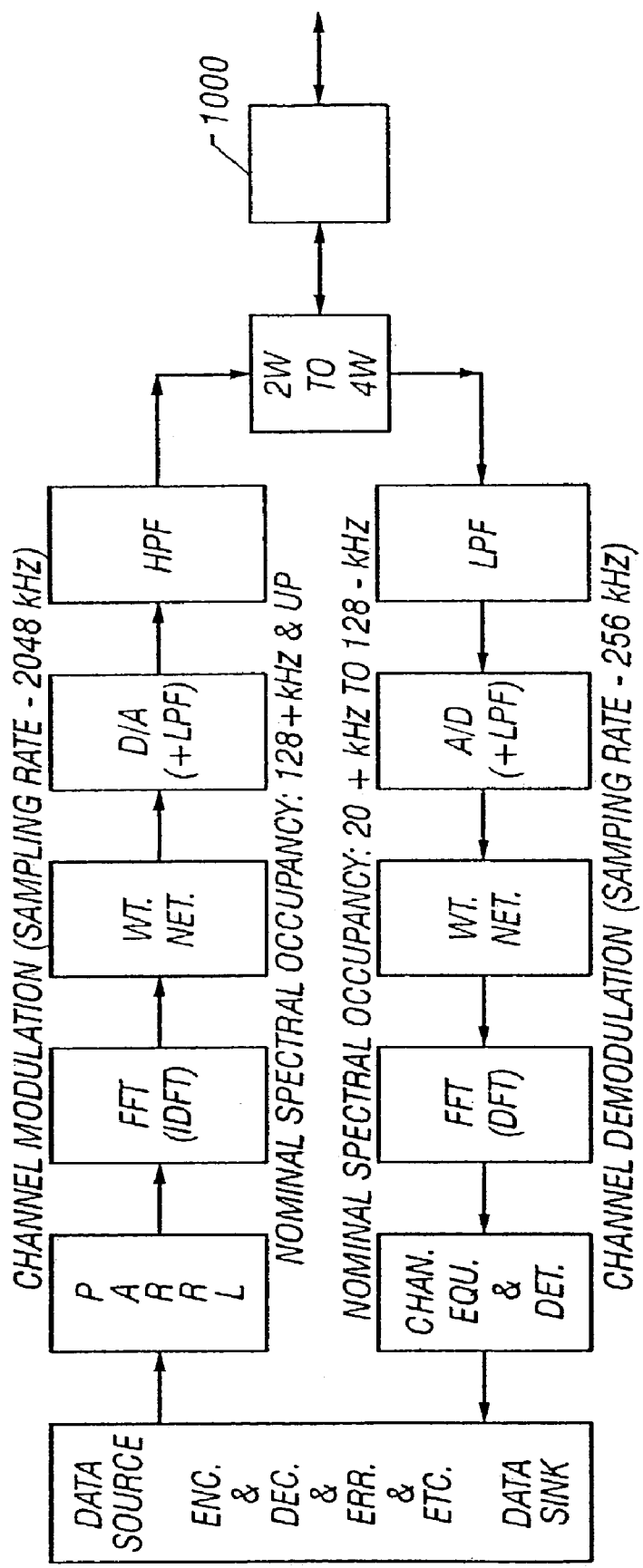
FIG. 10 illustrates a block schematic view of an ADSL configuration using an improved data pump (ATU-C side shown), representing an embodiment of the invention.

A configuration of an ADSL modem using the improved data pump is depicted in FIG. 10. Only the frequency division duplexing mode is shown here because we believe that with the line extender unit deployed, the echo-canceling version is not appropriate. However, the improved data pump method can indeed be used in an echo-canceling mode.

Still referring to FIG. 10, a high pass filter HPF unit is coupled to the D/A units. A 2 w-to-4 w converter is coupled to the HPF unit and the 2 w-to-4 w converter is also coupled to a low pass filter LPF unit which is in-turn coupled to the A/D unit. An ADSL repeater 1000 is coupled to the 2W-to-4 w converter.

Note the striking similarity between FIG. 3 and FIG. 10 which depict the DMT form and the Improved Data Pump form respectively (the improved data pump can also be called the "Transmux" form since it is based on the theory of the Transmultiplexer). The "back-end" processing related to data formatting, error detection and correction, coding, etc., can be the same for both data pumps. The distinction between them include the following points. First, DMT uses a cyclic prefix; the Transmux uses a Weighting Network (of R-point FIR filters). Second, DMT uses channel equalization for making the transmission medium appear "FIR"; the Transmux uses a Weighting Network (of R-point FIR filters). Third, the DMT scheme, to accommodate the cyclic prefix extension uses a line sampling rate which is greater than N-times the symbol-rate (the symbol-rate is 4 kHz for ADSL), while the Transmux scheme uses a line sampling rate of exactly N-times the symbol-rate.

The following charts compare and contrast the DMT and Transmux schemes for ADSL.

Chart 1 DMT/TRANSMUX Fundamentals

Key Concept:
  Channel frequency response is not "flat" (equalization problem).
  Additive noise is not evenly distributed in frequency DMT SOLUTION: Split up (wideband) channel into several (narrowband) channels and then:
  Over narrowband channel equalization is just a "flat gain"
  Allocate bits/symbol for each sub-channel individually TRANSMUX SOLUTION: Split up (wideband) channel into several (narrowband) channels and then:
  Over narrowband channel equalization is just a "flat gain"
  Allocate bits/symbol for each sub-channel individually Chart 2 DMT versus TRANSMUX Channel Definition Filter:
  DMT uses a rectangular window of length N=DFT-size. Adjacent channel attenuation as low as 13 dB.
  TRANSMUX uses filter of length R*N (R="number of active taps").
  Adjacent channel attenuation can be made as high as necessary. With R=3, stopband attenuation is typically 40 +dB.

Inter-Channel Symbol Interference (ICSI) Elimination
  DMT assumes wideband channel is FIR. Uses cyclic extension of symbol vector to "fake" cyclic convolution.

TRANSMUX assumes channel is reasonably flat over adjacent narrowband channels. ICSI eliminated by suitable channel-definition filter design (e.g. raised-cosine)

Chart 3 DMT versus TRANSMUX

EQUALIZATION REQUIREMENT:
 DMT requires wideband equalization to force wideband channel to "look FIR".
 TRANSMUX does not require wide-band equalization.

ECHO CANCELLATION (moot for Freq. Div. Duplexing):
 DMT requires precision wideband cancellation (adaptive wrt cable makeup)
 TRANSMUX can use multiple cancellers
 Coarse wideband (selectable 1 of M coefficient sets)
 Precise per-channel (adaptive wrt cable makeup)

Chart 4 DMT versus TRANSMUX

CHART 4

DMT versus TRANSMUX
Split-Band Operation (ATU-C)*

| Parameter | DMT | TRANSMUX |
|---|---|---|
| FFT (N = 512 & M = 64) | $N \cdot \log(N) + M \cdot \log(M)$ | $N \cdot \log(N) + M \cdot \log(M)$ |
| Cyclic prefix/ weighting-network | 0 | $3 \cdot N + 3 \cdot M = 1728$ |
| Time-Domain Equalizer | $32 \cdot M = 2048$ | 0 |
| Analog HPF rejection in 10 to 44 kHz band | X dB | (X − 27) dB |

*Operations at the symbol rate (4 kHz) ignoring cyclic prefix in DMT

Chart 5 DMT versus TRANSMUX

CHART 5

DMT versus TRANSMUX
Split-band Operation (ATU-R)*

| Parameter | DMT | TRANSMUX |
|---|---|---|
| FFT (N = 64 & M = 512) | $N \cdot \log(N) + M \cdot \log(M)$ | $N \cdot \log(N) + M \cdot \log(M)$ |
| Cyclic prefix/ weighting-network | 0 | $3 \cdot N + 3 \cdot M = 1728$ |
| Time-Domain Equalizer | $32 \cdot M = 16384$ | 0 |
| Analog LPF rejection in 20 to 84 kHz | X dB | (X − 27) dB |

*Operations at the symbol rate (4 kHz) ignoring cyclic prefix in DMT

One of the benefits in using a better channel definition filter is the relaxing of the attenuation requirements of the analog filters that separate the two directions of transmission in the ATU-C and the ATU-R. Because of the improved performance, less signal (power) "spreads" into the other band. In particular even with 3 active taps (R=3), the intrinsic characteristic of the Transmux scheme is to reduce the signal power in the other band by about 27 dB.

The efficacy of using more than one active tap is demonstrated in the following charts which indicate spectral occupancy. The DMT scheme frequency characteristic were computed, for the purposes of these charts, by ignoring the cyclic prefix. Thus both the Transmux scheme and DMT scheme used a symbol rate of 4 kHz and a line sampling rate of N*4 kHz, i.e., 256 kHz in the upstream direction and 2048 kHz in the downstream direction. The DMT scheme corresponds to a "rectangular window" filter or, equivalently, 1 active tap. For the Transmux scheme we assumed 3 active taps and used a Hamming frequency characteristic which, while not optional, is adequate to demonstrate the frequency behavior that can be expected.

It is clear that the longer prototype filter used for the Transmux scheme has a much better low-pass filter characteristic. This translates immediately into the power spectral density of the transmitted signals. In generating the power spectral plots it was assumed that all channels were equally loaded with random data. Note that the Transmux scheme has much lower sidebands and thus the power that leaks into frequencies outside the sub-channel bandwidth is much less than for the DMT case.

Figure 11:
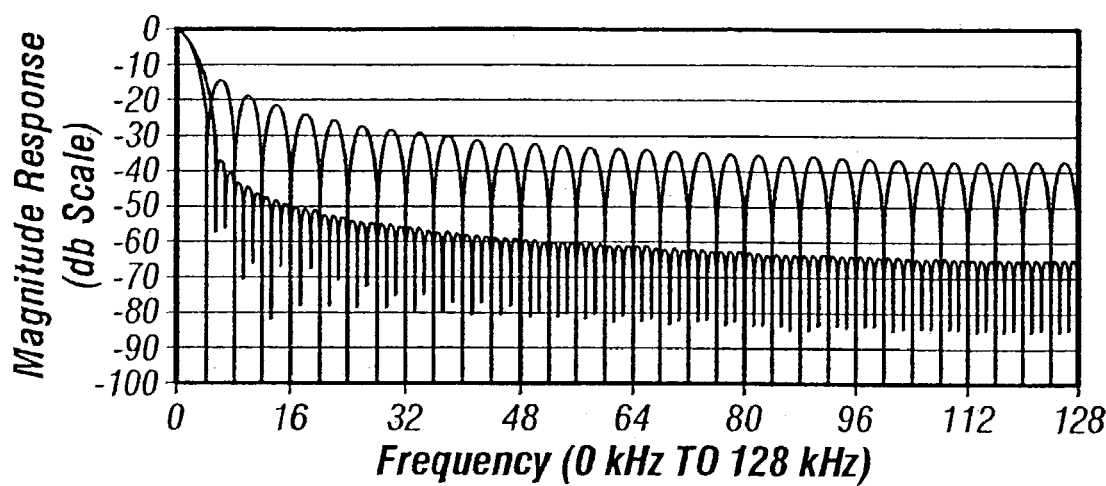
FIG. 11 illustrates a frequency response of a low-pass filter, representing an embodiment of the invention.
Figure 12:
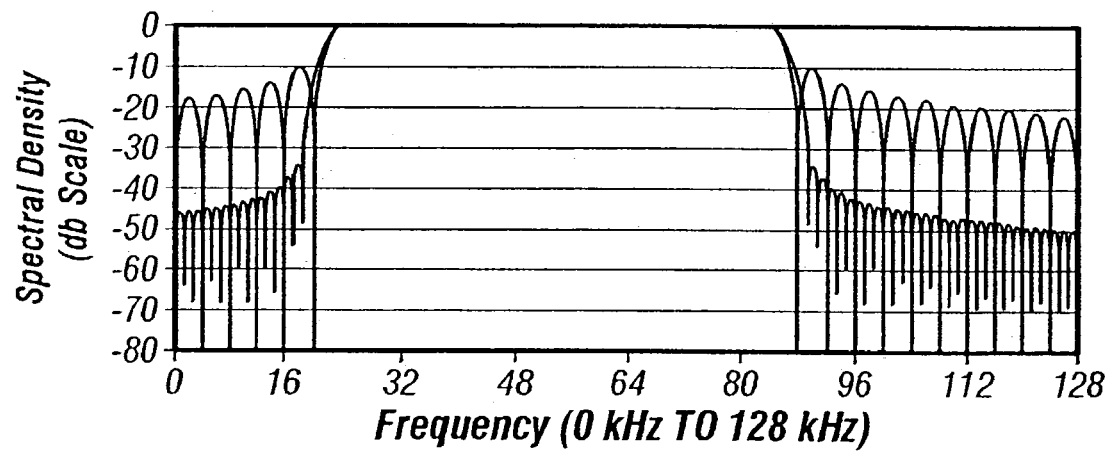
FIG. 12 illustrates a power spectral density for an upstream signal, representing an embodiment of the invention.
Figure 13:
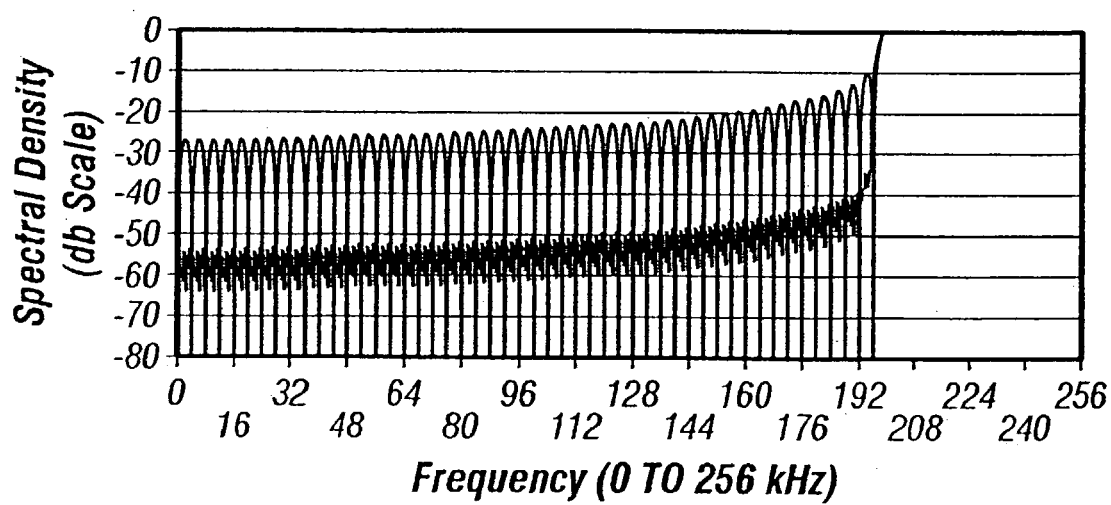
FIG. 13 illustrates a power spectral density for a downstream signal, representing an embodiment of the invention.

FIG. 11 shows a frequency response of a prototype low-pass filter for an upstream signal. FIG. 12 shows an exemplary power spectral density for an upstream signal assuming FDD operation and a highest sub-channel carrier frequency of 84 kHz. FIG. 13 illustrates an exemplary power spectral density for a downstream signal assuming FDD and a lowest sub-channel carrier of 200 kHz. The frequency range from 256 kHz to 1024 kHz not shown in FIG. 13.

The invention can also utilize data processing methods that transform signals from the digital subscriber loop to actuate interconnected discrete hardware elements. For example, to remotely fine-tune (gain adjustment and/or band-pass adjustment) and/or reconfigure (downstream/upstream reallocation) repeater(s) after initial installation using on network control signals sent over the DSL.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system. The terms including and/or having, as used herein, are defined as comprising (i.e., open language). The terms a or an, as used herein, are defined as one or more than one. The term another, as used herein, is defined as at least a second or more.

Practical Applications of the Invention

A practical application of the invention that has value within the technological arts is local digital subscriber loop service. Further, the invention is useful in conjunction with digital subscriber loop networks (such as are used for the purpose of local area networks or metropolitan area networks or wide area networks), or the like. There are virtually innumerable uses for the invention, all of which need not be detailed here.

Advantages of the Invention

A digital subscriber loop repeater, representing an embodiment of the invention can be cost effective and advantageous for at least the following reasons. The invention permits DSL to be provided on long loops. The invention permits DSL to be provided on loaded loops. The "Transmux" scheme is superior to the agreed upon standard, called "DMT", especially in situations where the separation of upstream and downstream traffic is achieved using filters; that is, in the Frequency Division Duplexing (or FDD) mode of operation. The new scheme is especially appropriate for providing ADSL over long subscriber loops which require "repeaters" or "extenders". While conventional DSL installation requires that all load coils be removed from a loop, the invention can include the replacement of these load coils with what can be termed an "ADSL Repeater" or "ADSL Extender". In particular, using ADSL Repeaters (in place of load coils), one particular form of ADSL that uses the technique of frequency-division-duplexing can be provided to customers over very long loops. A variation of the Repeater is the "Mid-Span Extender" where the unit is not necessarily placed at a load coil site. In addition, the invention improves quality and/or reduces costs compared to previous approaches.

All the disclosed embodiments of the invention disclosed herein can be made and used without undue experimentation in light of the disclosure. Although the best mode of carrying out the invention contemplated by the inventor(s) is disclosed, practice of the invention is not limited thereto. Accordingly, it will be appreciated by those skilled in the art that the invention may be practiced otherwise than as specifically described herein.

Further, the individual components need not be formed in the disclosed shapes, or combined in the disclosed configurations, but could be provided in virtually any shapes, and/or combined in virtually any configuration. Further, the individual components need not be fabricated from the disclosed materials, but could be fabricated from virtually any suitable materials.

Further, variation may be made in the steps or in the sequence of steps composing methods described herein. Further, although the digital subscriber loop repeaters described herein can be separate modules, it will be manifest that the repeaters may be integrated into the system with which they are associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

1. Walter Y. Chen, *DSL. Simulation Techniques and Standards Development for Digital Subscriber Line Systems*, Macmillan Technical Publishing, Indianapolis, 1998. ISBN: 1-57870-017-5.
2. Padmanand Warrier and Balaji Kumar, *XDSL Architecture*, McGraw-Hill, 1999. ISBN: 0-07-135006-3.
3. "G.992.1, Asymmetrcal Digital Subscriber Line (ADSL) Transceivers," Draft ITU Recommendation, COM 15-131.
4. "G.992.2, Splitterless Asymmetrical Digital Subscriber Line (ADSL) Transceivers," Draft ITU Recommendation COM 15-136.
5. Kishan Shenoi, *Digital Signal Processing in Telecommunications*, Prentice-Hall, Inc., Englewood Cliffs, N.J., 1995. ISBN: 0-13-096751-3.
6. Reference 5, especially Chapter 7 and references therein.
7a. U.S. Pat. No. 4,131,766, Issued Dec. 26, 1978, "Digital Filter Bank".
7b. U.S. Pat. No. 4,237,551, Issued Dec. 2, 1980, "Transmultiplexer".
8. Vaidyanathan, P. P., *Multirate Systems and Filter Banks*, Prentice-Hall, Inc., Englewood Cliffs, N.J., 1993.
9. The Electrical Engineering Handbook, CRC Press, (Richard C. Dorf et al. eds.), 1993.

What is claimed is:

1. A method, comprising:
splitting a transmission medium at an intermediate point between a first end and a second end to deploy a repeater circuit for extending said transmission medium, said repeater circuit having a first amplification interface and a second amplification interface;
coupling said repeater circuit at the intermediate point;
configuring said first amplification interface to provide a first gain adjustment as a function of a first attenuation of a first communication by a first direction impedance from said transmission medium while transmitting said first communication over said transmission medium from said first end to said second end; and
configuring said second amplification interface to provide a second gain adjustment as a function of a second attenuation of a second communication by a second direction impedance from said transmission medium while transmitting said second communication over said transmission medium from said second end to said first end,
wherein coupling said repeater circuit includes connecting said repeater circuit to said transmission medium in a parallel relationship with a load coil pair interposed between said first end and said second end,
wherein configuring said first amplification interface includes using a first weighting network, said first weighting network having a first filter bank including a first plurality of filters, each of said first plurality of filters having a filter length longer than a sample size, said first weighting network deployed to pump downstream data in said first direction while providing said first gain adjustment, and
configuring said second amplification interface includes using a second weighting network, said second weighting network having a second filter bank including a second plurality of filters, each of said second plurality of filters having said filter length longer than said sample size, said second weighting network deployed to pump upstream data in said second direction while providing said second gain adjustment.

2. The method of claim 1, wherein configuring said first amplification interface includes, sampling at a line-sampling rate defined by a product of said sample size and a symbol rate at which one or more symbols are generated for transmission, each of the one or more symbols defining a block of said sample size.

3. The method of claim 1, wherein configuring said second amplification interface includes, sampling at a line-sampling rate defined by a product of said sample size and a symbol rate at which one or more symbols are generated for transmission, each of the one or more symbols defining a block of said sample size.

4. An apparatus, comprising:
a modulator for transmitting a first communication, in a first direction over a transmission medium, said modulator operably coupled to a first amplification interface for providing a first gain adjustment, based on a first attenuation of said first communication in said first direction by a first direction impedance of said transmission medium; and
a demodulator operably coupled to said modulator, for receiving a second communication, in a second direction over said transmission medium, said demodulator operably coupled to a second amplification interface for providing a second gain adjustment, based on a second attenuation of said second communication in said second direction by a second direction impedance of said transmission medium,
the first amplification interface including a first filter bank having a first plurality of filters, each of said first plurality of filters having said filter length longer than a sample size to provide said second gain adjustment, and the second amplification interface including a second filter bank having a second plurality of filters, each of said second plurality of filters having said filter length longer than said sample size to provide said second gain adjustment.

5. A transceiver, comprising:
a modulation circuit for transmitting a first communication, in a first direction over a transmission medium, said modulation circuit including a first filter bank including a first plurality of filters, each of said first plurality of filters having a filter length longer than a sample size, deployed in said modulation circuit to provide a first gain adjustment, based on a first attenuation of said first communication in said first direction by a first direction impedance of said transmission medium; and
a demodulation circuit coupled to said modulation circuit, for receiving a second communication, in a second direction over said transmission medium, said demodulation circuit including a second filter bank including a second plurality of filters, each of said second plurality of filters having said filter length longer than said sample size, deployed in said demodulation circuit to provide a second gain adjustment, based on a second attenuation of said second communication in said second direction by a second direction impedance of said transmission medium.

6. The transceiver of claim 5, wherein the transceiver includes an asymmetric digital subscriber loop modem.

7. The transceiver of claim 5, wherein the transmission medium includes a subscriber loop interposed between a central office equipment and a customer premise equipment.

8. The transceiver of claim 7, wherein said first communication providing downstream data in said first direction over said subscriber loop.

9. The transceiver of claim 7, wherein said second communication providing upstream data in said second direction over said subscriber loop.

10. The transceiver of claim 7, wherein the modulation circuit includes a channel modulation circuit for transmitting from a data source at said central office equipment to said customer premise equipment said first communication.

11. The transceiver of claim 7, wherein the demodulation circuit includes a channel demodulation circuit for receiving from said customer premise equipment to a data sink at said central office equipment said second communication.

12. A method for extending a range of a digital subscriber loop signal which comprises utilizing the transceiver of claim 5.

13. A modem, comprising the transceiver of claim 5.

14. A repeater, comprising the modem of claim 13.

15. A kit, comprising: the transceiver of claim 5.

16. An asymmetric digital subscriber loop modem, comprising:
a channel modulation circuit for transmitting a first communication in a first direction over an asymmetric digital subscriber loop, said channel modulation circuit including a first weighting network, said first weighting network having a first filter bank including a first plurality of filters, each of said first plurality of filters having a filter length longer than a sample size, deployed to pump data in said first direction while providing a first gain adjustment, based on a first direction attenuation of said first communication by a first direction impedance of said asymmetric digital subscriber loop; and
a channel demodulation circuit coupled to said channel modulation circuit, for receiving a second communication in a second direction over said asymmetric digital subscriber loop, said channel demodulation circuit including a second weighting network, said second weighting network having a second filter bank including a second plurality of filters, each of said second plurality of filters having said filter length longer than said sample size, deployed to pump upstream data in said second direction while providing a second gain adjustment, based on a second direction attenuation of said second communication by a second direction impedance of said asymmetric digital subscriber loop.

17. The asymmetric digital subscriber loop modem of claim 16, wherein said first communication uses a first frequency range and said second communication uses a second frequency range that does not overlap said first frequency range.

18. The asymmetric digital subscriber loop modem of claim 16, wherein said first plurality of filters includes a first set of digital finite impulse response filters, each of said first set of digital finite impulse response filters having a length that is a product of a number of active taps and said sample size.

19. The asymmetric digital subscriber loop modem of claim 18, wherein said second plurality of filters includes a second set of digital finite impulse response filters, each of said second set of digital finite impulse response filters having said length that is the product of said number of active taps and said sample size.

20. The asymmetric digital subscriber loop modem of claim 19, wherein said asymmetric digital subscriber loop modem samples at a line-sampling rate defined by a product of said sample size and a symbol rate at which one or more symbols are generated for transmission, each symbol of said one or more symbols defining a block of said sample size.

21. A method for extending a range of a digital subscriber loop signal which comprises utilizing the asymmetric digital subscriber loop modem of claim 16.

22. A repeater, comprising the asymmetric digital subscriber loop modem of claim 16.

23. A kit, comprising: the asymmetric digital subscriber loop modem of claim 16.

24. A communication system, comprising:
 a channel modulation circuit for transmitting from a data source at a central office equipment to a customer premise equipment, a first communication having downstream data in a first direction over a subscriber loop interposed between said central office equipment and said customer premise equipment, said channel modulation circuit including a first weighting network, said first weighting network having a first filter bank including a first plurality of filters, each of said first plurality of filters having a filter length longer than a sample size, deployed to pump downstream data in said first direction while providing a first gain adjustment, based on a first direction attenuation of said first communication by a first direction impedance of said subscriber loop; and
 a channel demodulation circuit coupled to said channel modulation circuit, for receiving from said customer premise equipment to a data sink at said central office equipment, a second communication having upstream data in a second direction over said subscriber loop, said channel demodulation circuit including a second weighting network, said second weighting network having a second filter bank including a second plurality of filters, each of said second plurality of filters having said filter length longer than said sample size, deployed to pump upstream data in said second direction while providing a second gain adjustment, based on a second direction attenuation of said second communication by a second direction impedance of said subscriber loop,
 wherein said communication system is operably coupled to said subscriber loop, the system providing a simultaneous access to the subscriber loop by a plain old telephone service telephone equipment transmitting voice communications in a first frequency band, and by an asymmetric digital subscriber loop modem transmitting asymmetric digital subscriber loop communications in a second frequency band higher than the first frequency band.

\* \* \* \* \*